United States Patent [19]
Adsetts

[11] 3,926,584

[45] Dec. 16, 1975

[54] CATALYST AND CATALYTIC PROCESS

[75] Inventor: John Robert Adsetts, Norton, England

[73] Assignee: Imperial Chemical Industries Limited, London, England

[22] Filed: Apr. 22, 1974

[21] Appl. No.: 463,141

[30] Foreign Application Priority Data
Apr. 30, 1973 United Kingdom............... 20420/73

[52] U.S. Cl................ 48/214; 252/466 R; 252/473; 252/474; 48/213
[51] Int. Cl.$^2$.......................................... C01B 2/14
[58] Field of Search..................... 48/214, 213, 197; 252/466 R, 470, 473, 474; 260/449 M

[56] References Cited
UNITED STATES PATENTS

| | | | |
|---|---|---|---|
| 3,271,325 | 9/1966 | Davies et al. | 48/214 X |
| 3,334,055 | 8/1967 | Dowden et al. | 48/214 X |
| 3,417,029 | 12/1968 | McMahon | 48/214 X |
| 3,418,093 | 12/1968 | Davies | 48/214 |
| 3,421,871 | 1/1969 | Davies | 48/214 |
| 3,433,609 | 3/1969 | Percival | 48/214 |
| 3,451,949 | 6/1969 | Topsoe | 48/214 X |
| 3,507,811 | 4/1970 | Davies | 48/214 X |

*Primary Examiner*—R. E. Serwin
*Attorney, Agent, or Firm*—Cushman, Darby & Cushman

[57] ABSTRACT

A process for reacting hydrocarbons of higher molecular weight than methane with steam over a catalyst at low temperatures, ie 200°–650°C, to produce, preferably gases typically containing 50–70 percent of methane, can be carried out for long periods without changing the catalyst if the catalyst is the product of reducing a percursor composition containing by weight 25–90 percent of a nickel compound calculated as NiO, alumina, 0.1 to 10 percent of an alkaline earth metal compound calculated as MgO and 0.05 to 3.5 percent of an alkali metal compound calculated as equivalent $K_2O$, the nickel oxide and alumina having been brought together by co-precipitation.

3 Claims, No Drawings

CATALYST AND CATALYTIC PROCESS

This invention relates to a catalyst suitable inter alia for the low temperature reaction of steam with hydrocarbons of higher molecular weight than methane and to a process of producing a gas by such a reaction.

The reaction of steam with such hydrocarbons at temperatures in the range 200°–650°C over a nickel catalyst of high activity has been known for many years. The process has been practised industrially for producing a gas containing a substantial proportion of methane, but has required improvement in order to lengthen the life of the catalyst. It was proposed in United Kingdom specification 969637 to lengthen the life of the catalyst by having an oxide, hydroxide or carbonate of an alkali metal or alkaline earth metal present in it. It was proposed in specification 1155843 to lengthen the life of the catalyst by having 10–30 percent by weight (as metal) of an alkaline earth metal oxide, hydroxide or carbonate present, this being a larger proportion than was specifically disclosed in 969637. We have now found that a catalyst containing both an alkali metal compound and an alkaline earth metal compound has a usefully long life, possibly longer than that of catalysts made according to either of those prior specifications.

In this specification the composition of the catalyst will be defined in terms of its precursor, that is, the composition that has to be treated with hydrogen before use, in order to reduce nickel compounds to nickel, which is the active catalytic component. The reduction is usually carried out in the hydrocarbon/steam reactor, so that the catalyst cannot come into contact with air. The composition is defined by weight on the total of its constituents that are non-volatile in air at 900°C, assuming them to be present as oxides.

According to the invention a process for the reaction at temperatures in the range 200°–650°C of steam with a feedstock that is one or more hydrocarbons having a higher molecular weight than methane but a boiling point under 350°C or is methanol, characterised by the use as catalyst of the product or reducing a precursor composition consisting essentially of a nickel compound in a proportion in the range 25–90 percent by weight calculated as nickel oxide NiO, alumina, a compound of an alkaline earth metal in a proportion in the range 0.1 to 10 percent by weight calculated as equivalent magnesium oxide and a compound of an alkali metal in a proportion in the range 0.05 to 3.5 percent calculated as equivalent potassium oxide $K_2O$, the nickel oxide and alumina having been brought together by co-precipitation of water-insoluble compounds of nickel and aluminium.

The alumina is preferably present in a hydratable or partly hydrated form, such as alumina monohydrate or gamma alumina. Suitably the total specific surface of the precursor composition is in the range 100–300 m²/g. The precursor composition preferably comprises not more than 30 percent of constituents other than those specified. Among such other constituents there may be mentioned inert refractory materials such as catalyst support oxides and hydraulic binding agents such as aluminous cements.

The nickel oxide content should be chosen to afford adequate activity in the process to be carried out and is preferably in the range 40–80 percent by weight.

The alkaline earth metal compound can be present as for example an oxide, hydrated oxide or carbonate. Such compounds of any of the alkaline earth metals can be present, but satisfactory results appear to be obtainable using magnesium or calcium and hence no great expense is incurred. The proportion of alkaline earth metal compound preferably in the range 0.5 to 4.0 percent calculated as equivalent MgO.

The alkali metal compound should be one that is alkaline or decomposable to an alkaline compound. Thus it can be for example a hydroxide, oxide, carbonate or aluminate after such decomposition. The proportion of alkali metal compound, calculated by weight as equivalent potassium oxide $K_2O$, is preferably in the range 0.25 to 0.75 percent when the catalyst is to be used for reacting hydrocarbons with steam in the substantial absence of hydrogen at the inlet to the catalyst, for example when the only hydrogen present is what remains after a preliminary hydrodesulphurisation step, possibly up to 0.2 molecule of $H_2$ per atom of carbon in the feedstock.

When a substantial proportion of hydrogen is present, such as when the reaction mixture includes recycled product gas or the product of a preceding hydrogen-producing reaction stage, the proportion of alkali metal compound is preferably in the range 1.0 to 2.5 percent.

The alkaline earth metal compound is added preferably by co-precipitation with the nickel and aluminium compounds. The alkali metal compounds can, if an alkali metal compound is used to effect the co-precipitation, be incorporated by limiting the extent of washing the precipitate; it is, however, preferred to wash the precipitate thoroughly, so as to leave less than 0.2 percent, especially less than 0.05 percent, of alkali metal oxide calculated as equivalent potassium oxide $K_2O$ on the non-volatile constituents of the catalyst in oxide form.

The co-precipitation is effected by reacting a solution containing an aluminium and a nickel salt, suitably the nitrate or acetate, with an alkali metal compound such as the carbonate, bicarbonate or hydroxide. Less conveniently owing to the formation of soluble ammine compounds, an ammonium compound can be used. If the alkaline earth metal compound is introduced by co-precipitation a soluble compound of it should be present in the nickel salt solution. If desired, co-precipitation can be effected by bringing solutions of cation salts of nickel and/or aluminium and/or alkaline earth metal simultaneously into reaction with the precipitant instead of having such salts present in a single solution.

The co-precipitation is suitably carried out at over 50°C. Preferably an excess of alkaline precipitant is used, suitably up to about 100 percent. An ageing step may be employed if desired. After washing and drying, the precipitate is calcined suitably at 400°–600°C. Reduction of the calcined product is suitably by means of hydrogen at a temperature in the range 250°–600°C, preferably not much higher if any than the temperature of the steam/hydrocarbon reaction in which it is to be used. At some stage after the washing of the precipitate the constituents are brought to the state of aggregation required for the steam/hydrocarbon reaction. Usually this reaction is carried out in a fixed catalyst bed, for which the catalyst is suitably in particles having diameters in the range 2–7mm. Suitably the catalyst for such a bed is in the form of cylinders and these can be made by compression of the precipitate or of the partly or fully calcined precipitate.

The process can be at a high space velocity, such that the gaseous products are chiefly hydrogen and carbon dioxide and a considerable proportion of the feedstock passes through the catalyst unconverted. Preferably it is at a low space velocity, such that the reaction to hydrogen and carbon dioxide is succeeded by reaction of hydrogen with carbon oxides or with feedstock to give methane. The reaction to hydrogen and carbon oxides is endothermic but the combination of reactions is exothermic or thermally about neutral, owing to the strong heat evolution of the second reaction. The combination of reactions is more controllable than the reaction to hydrogen and carbon oxides since its products are near chemical equilibrium and therefore do not vary much in composition with changes in space velocity or catalyst activity.

The heat required for the reaction to hydrogen and carbon oxides can be supplied by pre-heating the reactants to, for example 350°–500°C. When the succeeding exothermic reaction takes place, the temperature (which falls in the initial endothermic stage) rises to an outlet level that is usually higher than the reactants preheat temperature. The process is usually carried out in an adiabatic reactor.

The pressure for the process is suitably in the range 1–100 ata, conveniently 10–75 ata.

The ratio of steam to hydrocarbon or methanol is suitably 1 to 5 by weight, that is about 0.8 to 3.8 molecules of steam per atom of carbon in a feedstock of empirical formula $CH_2$. The feedstock can be all fed to all the steam at the entry to the catalyst bed or in stages, such that the steam ratio is not reached until after the last portion of it has been fed.

The process can be carried out in the presence of hydrogen, carbon oxides or methane or more than one of these, derived from a separate reaction stage (which may be of the endothermic tubular type) or can be re-cycled product gas. The gas produced by the process typically contains 50–70 percent of methane after removal of excess steam. It may be subjected to one or more methanation stages without or with removal of steam and/or carbon dioxide, in order to produce a gas of higher methane content suitable for use as a substitute natural gas. Alternatively it may be subjected to one or more stages of steam reforming and/or partial oxidation in order to produce a hydrogen containing gas suitable for use, after suitable purification, in ammonia synthesis, methanol or hydrocarbon synthesis, hydrogenation or metal smelting.

The feedstock is preferably a hydrocarbon having a boiling point under 220°C, for example a naphtha boiling over the range 30°–170°C, or a liquefied petroleum gas (mainly propane or butane). If the feedstock is methanol, this may contain hydrocarbon derivatives as impurities.

EXAMPLE 1

Catalyst preparation a. control

A solution (2.5 L) containing nickel nitrate hexahydrate (1000g) and aluminium nitrate nonahydrate (500 g) was precipitated at over 90°C by reaction with sodium carbonate solution (770 g., 33 percent excess). The precipitate was filtered, washed until the pH of the filtrate had fallen to below 8, then mixed with enough of a solution of potassium carbonate to add 1.0 percent of $K_2O$ calculated on the mixture calcined at 900°C. The resulting slurry was dried at 100°–150°C, calcined for 6 hours at 400°–500°C then ground to pass a BSS 18 sieve and pelleted by compression into cylindrical pellets 3.2 mm in diameter and height.

b. magnesia-containing catalysts

The above preparation was repeated, with partial substitution of magnesium nitrate hexahydrate for aluminium nitrate nonahydrate so as to give 2, 4, 6 and 12 percent of magnesium oxide. It was observed that the precipitate was more easily washed, the higher its content of magnesium carbonate.

Catalyst precursors (a) and (b) all contained 76 percent NiO, 1 percent $K_2O$, balance alumina and (if any) magnesia.

Catalyst test

These catalyst precursors were each charged to an adiabatic reactor, reduced with hydrogen at 400 psig pressure at 450°–500°C until no further water was formed and then operated in the following conditions:

Feedstock: straight run naphtha boiling at 30°–170°C and containing under 0.2 ppm of sulphur;
Steam/naphtha ratio: 1.5 by weight;
Rate of feed: 1,000 pounds of naphtha per square foot of catalyst per hour;
Pressure: 400 psig (28 ata) at exit;
Temperature: pre-heat 450°C exit 520°C;
Length of run: 700 hours.

The temperature was also measured by thermocouples disposed in the bed of catalyst. It was observed that the position of the maximum measured temperature moved slowly through the bed towards the exit, showing that deactivation was taking place. The rate of movement in inches per 100 hours was as follows:

| %MgO | 0 | 2 | 4 | 6 | 12 |
|---|---|---|---|---|---|
| Movement rate | 1.73 | 1.25 | 1.98 | 4.0 | 33.0 |

Although at 4 percent MgO and above the rate of movement is higher than in absence of MgO, the greater ease of filtration of the precipitates leads to more reproducible results, and hence MgO contents up to 10 percent are considered to be advantageous overall.

EXAMPLE 2

Preparation (b) was repeated, except that the MgO content was 2.5 percent and the $K_2O$ content 0.6 percent. The rate of movement of the temperature maximum was now only 1.15 inch per 100 hours.

I claim:

1. A process for the reaction at temperatures in the range 200°–650°C of steam with a feedstock containing at least one hydrocarbon having a higher molecular weight than methane or is methanol comprising reacting said steam and feedstock in the presence of a catalyst, said catalyst being the product of reducing a precursor composition consisting essentially of a nickel compound in a proportion in the range 25–90 percent by weight calculated as nickel oxide NiO, alumina, an alkaline earth metal compound in a proportion in the range 0.1 to 10 percent by weight calculated as equivalent magnesium oxide, and an alkali metal compound in a proportion in the range 0.05 to 3.5 percent calculated as equivalent potassium oxide $K_2O$, the nickel oxide and alumina having been brought together by co-precipitation of water-insoluble compounds of nickel and aluminum with said alkaline earth compound, the space velocity being low enough to permit the methane forming reaction of hydrogen with carbon oxides or feedstock to proceed near equilibrium so as to produce a gas containing 50–70 percent of methane after removal of excess steam.

2. A process according to claim 1 in which hydrocarbons are reacted with steam in the substantial absence of hydrogen and the proportion of alkali metal compound in the catalyst is in the range 0.25 to 0.75 percent by weight.

3. A process according to claim 1 in which hydrocarbons are reacted with steam in the presence of hydrogen and the proportion of alkali metal compound is in the range 1 to 2.5 percent by weight.

* * * * *